United States Patent
Ou et al.

(10) Patent No.: US 10,157,251 B2
(45) Date of Patent: Dec. 18, 2018

(54) METHOD AND SYSTEM FOR PARTITIONING CIRCUIT CELLS

(71) Applicant: TAIWAN SEMICONDUCTOR MANUFACTURING CO., LTD., Hsinchu (TW)

(72) Inventors: Hung-Chih Ou, Kaohsiung (TW); Chun-Chen Chen, Hsinchu County (TW); Sheng-Hsiung Chen, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 77 days.

(21) Appl. No.: 15/353,872

(22) Filed: Nov. 17, 2016

(65) Prior Publication Data

US 2018/0137230 A1    May 17, 2018

(51) Int. Cl.
*G06F 17/50* (2006.01)

(52) U.S. Cl.
CPC ...... *G06F 17/5072* (2013.01); *G06F 17/5068* (2013.01); *G06F 2217/12* (2013.01)

(58) Field of Classification Search
None
See application file for complete search history.

(56) References Cited

U.S. PATENT DOCUMENTS

| | | | | |
|---|---|---|---|---|
| 8,966,426 | B1* | 2/2015 | Liu et al. ............ | G06F 17/5072 716/122 |
| 9,021,414 | B1* | 4/2015 | Or-Bach et al. ..... | G06F 17/5077 716/122 |
| 9,514,261 | B2* | 12/2016 | Liu et al. ............ | G06F 17/5072 716/122 |
| 2016/0042110 | A1* | 2/2016 | Lim et al. ........... | G06F 17/5072 716/122 |
| 2016/0191058 | A1* | 6/2016 | Bisht et al. ......... | H03K 19/01750 716/122 |

OTHER PUBLICATIONS

G. Berhault et al., "3DIP: An Interative Partitioning Tool for Monolithic 3D IC," 2016 IEEE Int'l 3D Systems Integration Conference (3DIC), 5 pages.*
C.-C. Chan et al.,"3DICE: 3D IC Cost Evaluation Based on Fast Tier Number Estimation," 12th Int'l Symposium on Quality Electronic Design, 2011 IEEE, 6 pages.*
K. Chang et al., "Cascade2D: A Design-Aware Partitioning Approach to Monolithic 3D IC with 2D Commercial Tools," 2016 ACM/ICCAD, 8 pages.*

(Continued)

*Primary Examiner* — Leigh M Garbowski
(74) *Attorney, Agent, or Firm* — McClure, Qualey & Rodack, LLP

(57) ABSTRACT

A method includes following operations. First circuit cells are partitioned into a first frame of a first tier and the first frame of a second tier. The first frame is divided into second frames according to a step size. The first circuit cells between the second frames of the first tier and the second tier are adjusted. The first tier and the second tier, to which the adjusted first circuit cells are assigned, are merged to generate data indicating a layout design, for fabrication of the circuit cells.

20 Claims, 7 Drawing Sheets

(56) References Cited

OTHER PUBLICATIONS

P. Ghosal et al., "Partitioning in 3D ICs: A TSV Aware Strategy with Area Balancing," 2012 Int'l COnference opn Devices, Circuits and Systems, 5 pages.*

Y.H. Lai et al., "Simultaneous Layer-aware and Region-aware Partitioning for 3D IC," 2016 IEEE APCCAS, pp. 502-505.*

S. Panth et al., "Placement-Driven Partitioning for Congestion Mitigation in Monolithic 3D IC Designs," IEEE Trans. on CAD of ICs and Systems, vol. 34, No. 4, Paril 2015, pp. 540-553.*

4 7 pages.*

* cited by examiner

METHOD AND SYSTEM FOR PARTITIONING CIRCUIT CELLS

BACKGROUND

To improve an integration of circuit cells, a three-dimensional integrated circuit (3D IC) is developed. The 3D IC includes two or more layers of active electronic components integrated vertically and horizontally into a single circuit. In some applications, the 3D IC is manufactured with fabrication process in two or more stacked tiers. For example, active devices in an upper tier are formed on a semiconductor layer over the interconnect structure in an adjacent lower tier, in which the upper tier is stacked above the adjacent lower tier.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
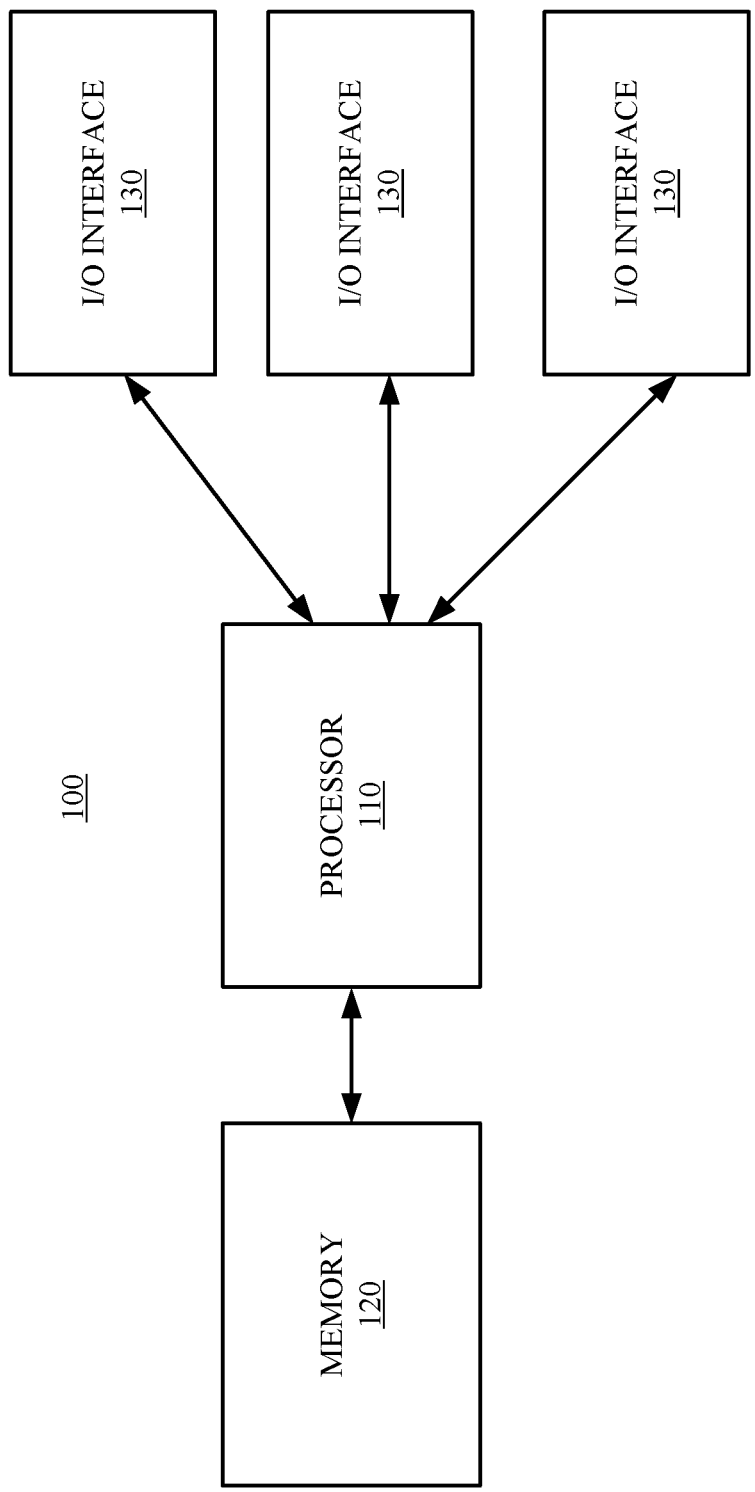
FIG. 1 is a schematic diagram of a system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Reference is now made to FIG. 1. FIG. 1 is a schematic diagram of a system 100, in accordance with some embodiments of the present disclosure.

The system 100 includes a processor 110, a memory 120, and input/output (I/O) interfaces 130. The processor 110 is coupled to the memory 120 and the I/O interfaces 130. In various embodiments, the processor 110 is a central processing unit (CPU), an application specific integrated circuit (ASIC), a multi-processor, a distributed processing system, or a suitable processing unit. Various circuits or units to implement the processor 110 are within the contemplated scope of the present disclosure. In some embodiments, operations discussed in the present disclosure, by using the system 100 in FIG. 1, are virtually performed. In some embodiments, the term "virtually" indicates that the operations discussed in the present disclosure correspond to a series of data-processing and/or data computations.

The memory 120 stores one or more program codes for aiding design of integrating circuits. In some embodiments, the memory 120 stores program codes encoded with a set of instructions for partitioning circuit cells (e.g., circuit cells Ci in FIG. 4A) into different groups in different tiers in a three-dimensional (3D) chip. For illustration, the processor 110 executes the program codes stored in the memory 120 to automatically perform the operations of partitioning circuit cells. In some embodiments, the term "tier" is referred to as a layer where one group of circuit cells is located, in the 3D chip. In some embodiments, the operation of partitioning circuit cells is referred to as gathering and arranging data, which are associated with the circuit cells, into groups that are to be displayed and/or shown as objects in different tiers.

In some embodiments, each one of the circuit cells includes at least one electronic component including, for example, transistors, capacitors, resistors, and/or inductors. The implementations of the circuit cells are given for illustrative purposes only. Various devices, which are able to implement the circuit cells, are within the contemplated scope of the present disclosure.

In some other embodiments, the memory 120 stores program codes encoded with a set of instructions for performing an automatic place and route (APR) operation. The processor 110 is able to execute the program codes stored in the memory 120, and the operations of the APR are able to be automatically performed.

In some embodiments, the memory 120 is a non-transitory computer readable storage medium encoded with, i.e., storing, a set of executable instructions. For illustration, the memory 120 stores executable instructions for performing operations including, for example, operations S210, S220, S230, S240 and S250 illustrated in FIG. 2. In some embodiments, the computer readable storage medium includes non-volatile memory such as read-only memory (ROM), programmable read only memory (PROM), erasable programmable read only memory (EPROM), and electrically erasable programmable read only memory (EEPROM) devices. In some embodiments, the computer readable storage medium includes volatile memory such as static random access memory (SRAM), dynamic random access memory (DRAM), and double data rate random access memory (DDR-RAM). In some embodiments, the computer readable storage medium includes optical storage devices such as CD-ROMs and digital versatile disc read only memories (DVD-ROMs). In some embodiments, the computer readable storage medium includes magnetic storage devices such as hard disk drives (HDD) and floppy disk drives.

The I/O interfaces 130 receive inputs or commands from various control devices (not shown), which, for example, are operated by a circuit designer and/or a layout designer. Accordingly, the system 100 is able to be operated with the inputs or commands received by the I/O interfaces 130. In some embodiments, the I/O interfaces 130 include a display configured to display the status of executing the program codes. In some embodiments, the I/O interfaces 130 include a graphical user interface (GUI). In some other embodiments, the I/O interfaces 130 include a keyboard, keypad, mouse, trackball, track-pad, touch screen, cursor direction keys, or the combination thereof, for communicating information and commands with the processor 110.

Figure 2:
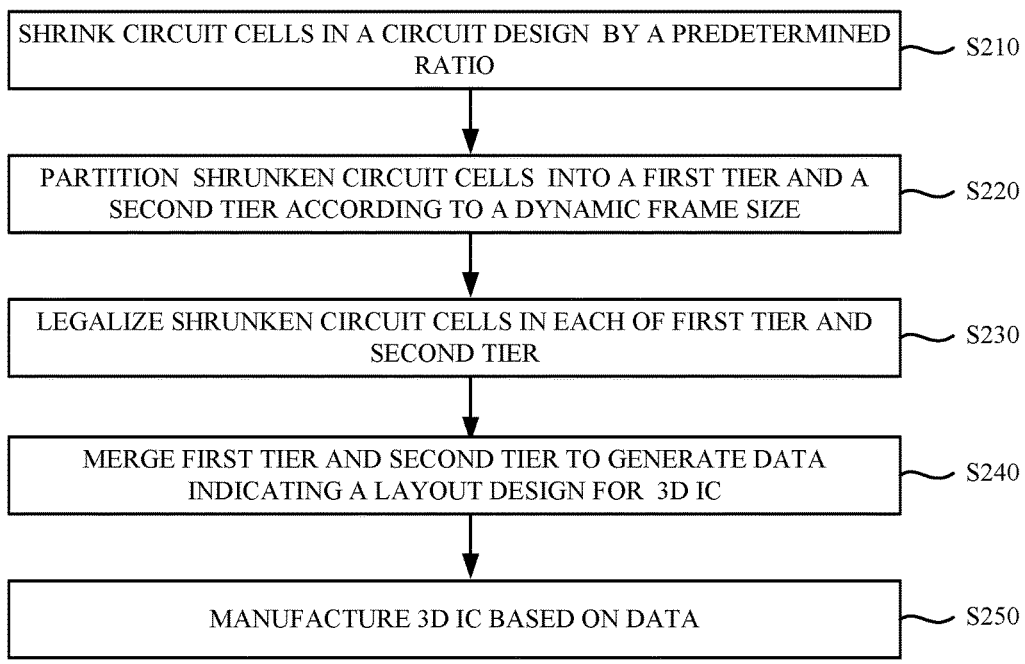
FIG. 2 is a flow chart illustrating operations of a method, in accordance with some embodiments of the present disclosure.

Reference is now made to FIG. 2. FIG. 2 is a flow chart illustrating operations of a method 200, in accordance with some embodiments of the present disclosure. In some embodiments, the method 200 is implemented with an electronic design automation (EDA) tool carried in the system 100 in FIG. 1. In some embodiments, the method 200 is implemented with software that is executable on the processor 110 in FIG. 1 to perform operations of partitioning circuit cells.

In operation S210, sizes of circuit cells in a circuit design are shrunken, or reduced, by a predetermined ratio. For illustration in FIG. 1, data indicating a layout design for a circuit is received by the I/O interfaces 130, and are stored in the memory 120. The processor 110 is able to perform at least one design tool to analyze the data, in order to acquire sizes of circuit cells in the layout design. The processor 110 then performs the at least one design tool to multiply the sizes of the circuit cells by the predetermined ratio to shrink the sizes of the circuit cells. In some embodiments, the term "design tool" is referred to as software or programmed modules carried in the memory 120 in FIG. 1, and is executable by the processor 110 to perform the method 200 in FIG. 2.

In some embodiments, the predetermined ratio is greater than 0 and less than 1. In some embodiments, for a width and a height of a chip, the predetermined ratio ranges from about 0.6-0.8. In some embodiments, the value of the predetermined ratio is utilized to shrink the area of a chip by about half. In some embodiments, the value of the predetermined ratio is determined by at least one design tool according to a technology file associated with a manufacturing process for 3D IC. In some embodiments, the value of the predetermined ratio is set via the I/O interfaces 130, and is stored in the memory 120 in FIG. 1.

In some embodiments, by shrinking the circuit design, which is performed in operation S210, a layout design for a two-dimensional (2D) integrated circuit (IC) is able to be converted into a layout design for a three-dimensional (3D) IC, because the 2D layout design is normally shown to have a size, in a planar view, larger than that of the 3D layout design.

In operation S220, the shrunken circuit cells are partitioned into a first tier and a second tier (e.g., a first tier 401 and a second tier 402 in FIG. 4A) according to a dynamic frame size. In some embodiments, the term "frame" is a region (e.g., frames Fi-1, Fi-2, FS-1 and FS-2 in FIG. 4D), into which the shrunken circuit cells are partitioned, of the first tier and/or the second tier. In some embodiments, the term "frame size" is referred to as a size of each one of the frames of the first tier and the second tier. In some embodiments, the term "dynamic" indicates that the frame size is constantly changed in operation S220. The detailed descriptions regarding operation S220 will be provided with reference to FIGS. 3, 4A, 4B, 4C, and 4D below. In some embodiments, with operation S220, the shrunken circuit cells can be partitioned into different layers in the 3D IC, with different views on wire connections. As a result, the wire length reduction of the 3D IC is improved.

In operation S230, the shrunken circuit cells in each of the first tier and the second tier are legalized. In operation S240, the first tier and the second tier are merged to generate data indicating a layout design for 3D IC. In some embodiments, the operation of legalizing the shrunken circuit cells is referred to as removing unnecessary data, which are associated with at least one of the shrunken circuit cells, that overlaps another one of the shrunken circuit cells. In some embodiments, the layout design, indicated by the data generated in operation S240, shows locations of the shrunken circuit cells in each of the first tier and the second tier.

In some embodiments, when the shrunken circuit cells (e.g., circuit cells Ci in FIG. 4A) are overlapped with one another during the partition process, the processor 110 performs at least one design tool to remove at least one shrunken circuit cell of the shrunken circuit cells, that overlaps one another in each of the first tier and the second tier. After removing the overlapped shrunken circuit cell in one of the first tier and the second tier, the processor 110 performs at least one design tool to merge data indicating the first tier and data indicating the second tier, in order to generate the data indicating the layout design including the first tier and the second tier. Various layout designs to implement the 3D IC are within the contemplated scope of the present disclosure.

In operation S250, the 3D IC is manufactured based on the data generated in operation S240. In some embodiments, based on the data generated in operation S240, the processor 110 executes instructions to generate data and/or commands corresponding to the layout design, for available manufacturing equipments (not shown). Based on the generated data and/or commands, the available manufacturing equipments then fabricate semiconductor devices or integrated circuits. In some embodiments, the manufacturing equipments discussed above includes one or more semiconductor manufacturing equipments for performing semiconductor fabrication on wafer.

In some other embodiments, the processor 110 performs the APR tool, according to the data generated in operation S240, to generate wire connections between the shrunken circuit cells in the first tier and the second tier. The processor 110 then performs at least one simulation tool to run a post-simulation for the 3D IC. In some embodiments, the post-simulation indicates a testing of the performance of the 3D IC with consideration of parasitic effects in the wire connections. In some embodiments, the 3D IC includes a monolithic 3D IC. In some embodiments, the 3D IC is implemented with various methods, which include, for example, die-to-die, die-to-wafer, and wafer-to-wafer.

Figure 3:
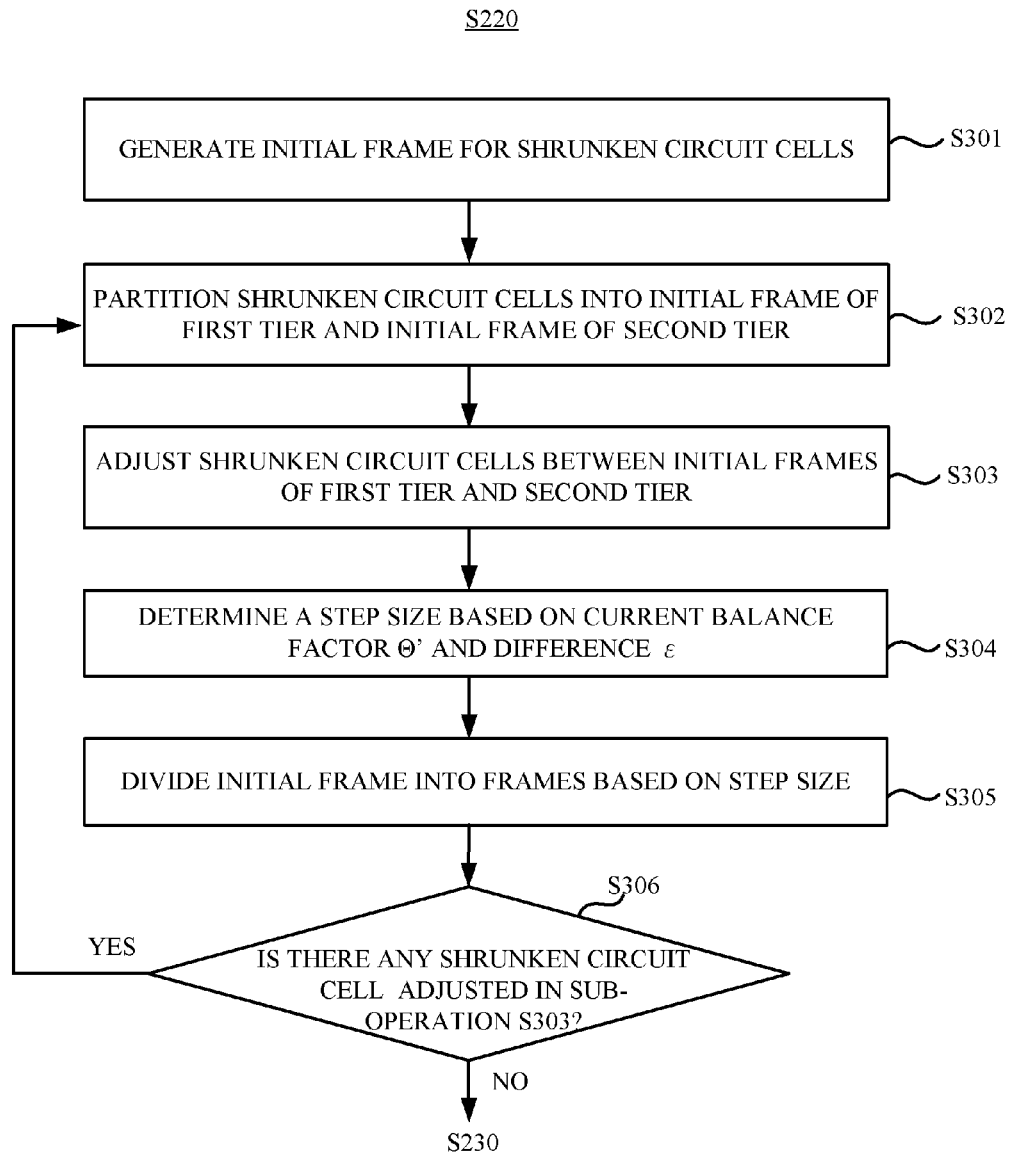
FIG. 3 is a flow chart of performing one operation of the method in FIG. 2, in accordance with some embodiments of the present disclosure.

FIG. 3 is a flow chart of performing operation S220 of the method 200 in FIG. 2, in accordance with some embodiments of the present disclosure. In some embodiments, operation S220 in FIG. 2 includes sub-operations S301, S302, S303, S304, S305, and S306.

In sub-operation S301, an initial frame for the shrunken circuit cells is generated. In sub-operation S302, the shrunken circuit cells are partitioned into the initial frame of the first tier and the initial frame of the second tier.

Figure 4A:
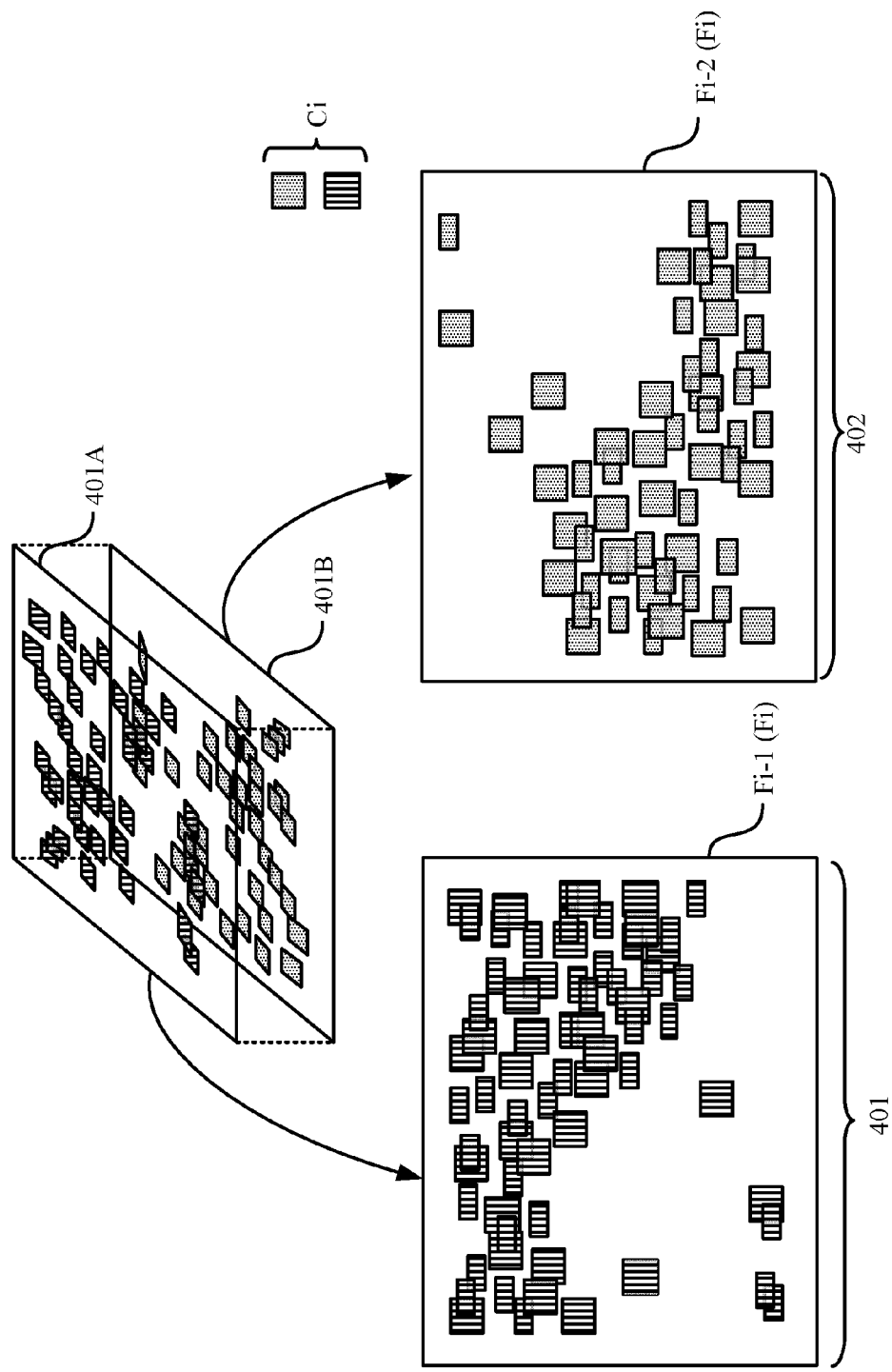
FIG. 4A is a schematic diagram of a first tier and a second tier including the shrunken circuit cells, in accordance with some embodiments of the present disclosure.

For illustrating sub-operations S301 and S302, reference is now made to FIG. 4A. FIG. 4A is a schematic diagram of a first tier 401 and a second tier 402 including the shrunken circuit cells, in accordance with some embodiments of the present disclosure. As discussed above, in some embodiments, the term "tier" indicates the layer, at which the shrunken circuit cells Ci are located, of a 3D IC. For illustration of FIG. 4A, the first tier 401 corresponds to a layer 401A, and the second tier 402 corresponds to a layer 401B, in which the layer 401A is stacked above the layer 402A. In some other embodiments, the first tier 401 corresponds to a layer that is stacked below a layer, to which the second tier 402 corresponds.

In some embodiments, the processor 110 performs at least one design tool to generate the initial frame Fi for the first tier 401 and the second tier 402. In some embodiments, the initial frame Fi is configured to cover the entire areas of the first tier 401 and the second tier 402. For illustration of FIG. 4A, the initial frame Fi is configured to have an area as same as the areas of the first tier 401 and the second tier 402. With the arrangement of the initial frame Fi, all of the shrunken circuit cells Ci in the initial frame Fi of the first tier 401 and the second tier 402 is able to be considered during the partition process.

In some embodiments, the processor 110 performs at least one design tool to partition, based on a predetermined balance factor $\ominus$, the shrunken circuit cells Ci into the initial frame Fi of the first tier 401 (for simplicity, hereinafter referred to as the frame Fi-1) and the initial frame Fi of the second tier 402 (for simplicity, hereinafter referred to as the frame Fi-2). In some embodiments, for two tiers (e.g., first tier 401 and second tier 402), the predetermined balance factor $\ominus$ is defined as a predetermined ratio of a number of the shrunken circuit cells Ci in the first tier 401 to a total number of the shrunken circuit cells Ci. In some embodiments, the predetermined balance factor $\ominus$ ranges from 0 to 1. In some other embodiments, the predetermined balance factor $\ominus$ is set to be in a range of about 0.4-0.6. With the arrangement of the predetermined balance factor $\ominus$, the number of the shrunken circuit cells Ci in the frame Fi-1 is able to be substantially close to the number of the shrunken circuit cells Ci in the frame Fi-2. As a result, the shrunken circuit cells between the two initial frames Fi-1 and Fi-2 are able to be uniformly distributed.

In some alternative embodiments, for two or more tiers, the predetermined balance factor $\ominus$ is defined as a maximum value of a ratio of the number of the shrunken circuit cells Ci to the number of total tiers. In some other embodiments, the predetermined balance factor $\ominus$ ranges from (1/C−T1) to (1/C+T2), in which C is the number of the total tiers, and T1-T2 are tolerance factors. In some embodiments, C is an integer that is greater than or equal to 2. In some embodiments, each of T1 and T2 ranges from 0 to 1/C. With such an arrangement, the shrunken circuit cells between at least two initial frames are able to be uniformly assigned.

In some embodiments with respect to FIG. 1, the value of the predetermined balance factor $\ominus$ is set via the I/O interfaces 130, and is stored in the memory 120. The above values of the predetermined balance factor $\ominus$ are given for illustrative purposes only. Various values of the predetermined balance factor $\ominus$ are within the contemplated scope of the present disclosure.

With continued reference to FIG. 3, in sub-operation S303, the shrunken circuit cells Ci between the frame Fi-1 and the frame Fi-2 are adjusted. In some embodiments, the processor 110 in FIG. 1 performs at least one design tool to adjust the shrunken circuit cells Ci between the frame Fi-1 and the frame Fi-2, based on a difference $\tau$ and a difference $\varepsilon$. The detailed discussion regarding the differences $\tau$ and $\varepsilon$ will be provided in the paragraphs below with reference to FIGS. 4B, 4C, and 4D.

In some embodiments, the difference $\tau$ is a difference between a number of pins of the shrunken circuit cells Ci in the frame Fi-1 and a number of pins of the shrunken circuit cells Ci in the frame Fi-2. In some embodiments, the term "pin" indicates an input terminal, an output terminal, or an end, which is coupled to another shrunken circuit cell, of the shrunken circuit cells Ci. In some embodiments, the processor 110 performs at least one design tool, to analyze locations of the pins of the shrunken circuit cells Ci in each of the frame Fi-1 and the frame Fi-2, in order to determine the difference $\tau$. In some embodiments, the number of the pins having connections is referred to as a number of connections (hereinafter referred to as "CUTS") between the frames Fi-1 and Fi-2.

Moreover, in some embodiment, the difference $\varepsilon$ is a difference between a number of the shrunken circuit cells Ci in the frame Fi-1 and a number of the shrunken circuit cells Ci in the frame Fi-2. In some embodiments, the processor 110 in FIG. 1 performs at least one design tool to analyze locations of the shrunken circuit cells Ci in each of the first tier 401 and the second tier 402, in order to determine the difference $\varepsilon$.

Figure 4B:
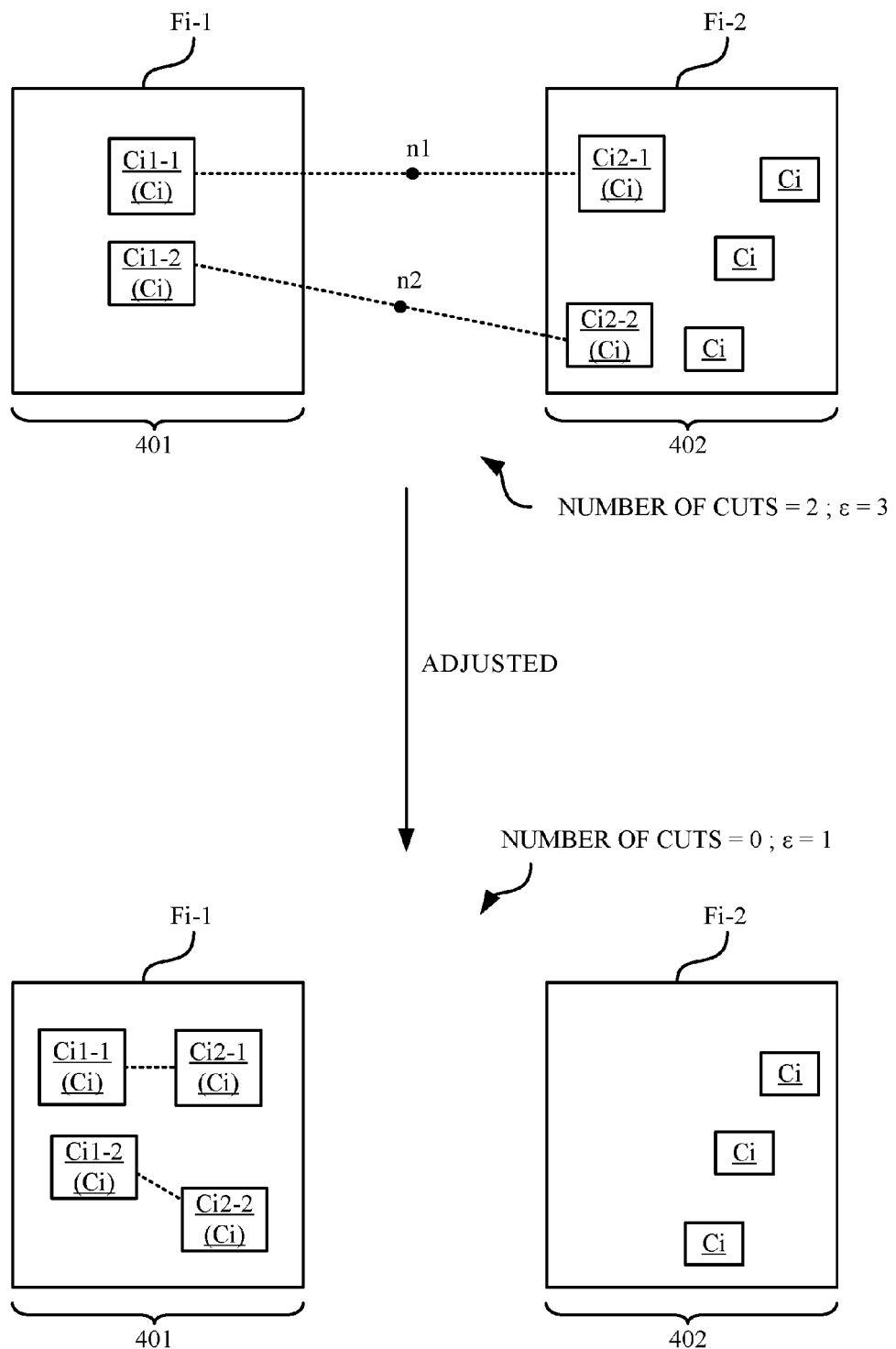
FIG. 4B is a schematic diagram illustrating a sub-operation in FIG. 3 performed on the first tier and the second tier in FIG. 4A, in accordance with some embodiments of the present disclosure.

For illustration of sub-operation S303, reference is made to FIG. 4B. FIG. 4B is a schematic diagram illustrating sub-operation S303 in FIG. 3 performed on the first tier 401 and the second tier 402 in FIG. 4A, in accordance with some embodiments of the present disclosure. For ease of understanding, with respect to FIG. 4A, like elements in FIG. 4B are designated with the same reference numbers.

As shown in FIG. 4B, two connections are present between the first tier 401 and the second tier 402, and thus the number of the connections (CUTS) between the first tier 401 and the second tier 402 is determined to be 2. In greater detail, a pin (not shown) of a shrunken circuit cell Ci1-1 in the frame Fi-1 and a pin (not shown) of a shrunken circuit cell Ci2-1 in the frame Fi-2 are coupled to a first net n1. In other words, the first net n1 is coupled to two pins in the first tier 401 and the second tier 402. A pin (not shown) of a shrunken circuit cell Ci1-2 in the frame Fi-1 and a pin (not shown) of a shrunken circuit cell Ci2-2 in the frame Fi-2 are coupled to a second net n2. In other words, the second net n2 is coupled to two pins in the first tier 401 and the second tier 402. In some embodiments, the term "net" is referred to wires that couple pins of the shrunken circuit cells Ci together. In some embodiments, the term "net" is associated with ports and/or terminals defined in a netlist file corresponding to the circuit design discussed in operation S210.

In some embodiments, at least one of the shrunken circuit cells Ci, which is coupled to a net, in the tier having more shrunken circuit cells is moved to the tier having less shrunken circuit cells, in a condition that a first number of the pins coupled to the net is less than a predetermined number of pins. The net is coupled between the frames Fi-1 and Fi-2 via the first number of the pins. For illustration of FIG. 4B, the first number of the pins coupled to the first net n1 or the second net n2 is 2, and the predetermined number of the pins is 3. The first tier 401 includes two shrunken circuit cells Ci, and the second tier 402 includes five shrunken circuit cells Ci. As the first number of the pins coupled to the first net or the second net is less than the predetermined number of the pins, the shrunken circuit cells Ci2-1 and Ci2-2, which are coupled to the shrunken circuit cells Ci1-1 and Ci1-2 respectively, in the second tier 402 are then moved to the first tier 401, as illustrated in FIG. 4B. As a result, the number of CUTs, which is associated with the difference $\tau$, between the first tier 401 and the second tier 402, is reduced to 0.

Moreover, as illustrated in FIG. 4B, before being adjusted, the number of the shrunken circuit cells Ci in the frame Fi-1 is 2, and the number of the shrunken circuit cells Ci in the frame Fi-1 is 5. Under this condition, the difference $\varepsilon$ is determined to be 3. After the shrunken circuit cells Ci are adjusted, the number of the shrunken circuit cells Ci in the frame Fi-1 is 4, the number of the shrunken circuit cells Ci in the frame Fi-1 is 3. Under this condition, the difference $\varepsilon$ is determined to be 1. Accordingly, with operation S303, the number of CUTS between the first tier 401 and the second tier 402 is reduced while the difference $\varepsilon$ between the numbers of the shrunken circuit cells Ci in the tiers 401 and 402 is minimized.

Figure 4C:
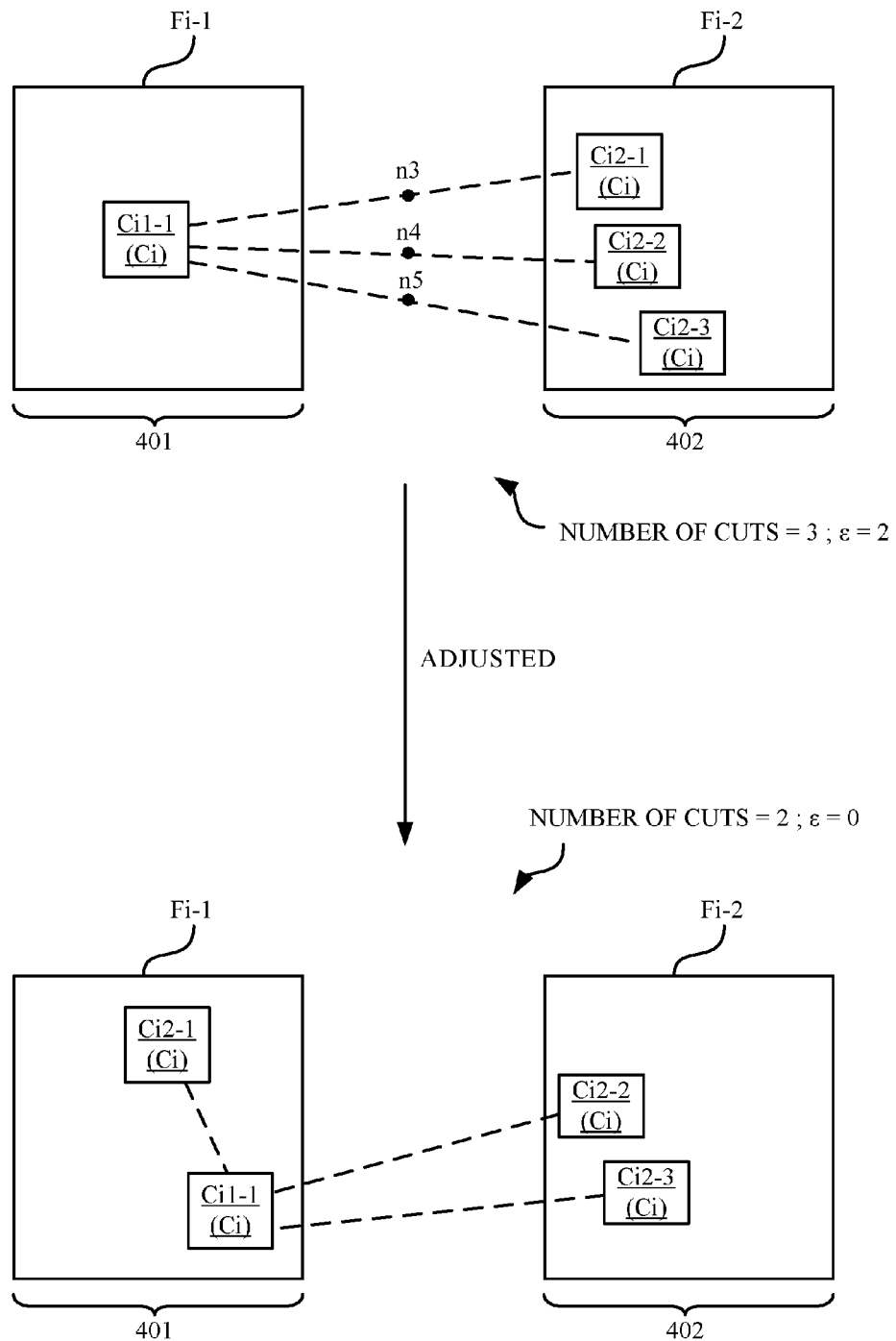
FIG. 4C is a schematic diagram illustrating a sub-operation in FIG. 3 performed on the first tier and the second tier in FIG. 4A, in accordance with some embodiments of the present disclosure.

Reference is now made to FIG. 4C. FIG. 4C is a schematic diagram illustrating sub-operation S303 in FIG. 3 performed on the first tier 401 and the second tier 402 in FIG. 4A, in accordance with various embodiments of the present disclosure. For ease of understanding, with respect to FIG. 4A, like elements in FIG. 4C are designated with the same reference numbers.

In some embodiments, at least two of the shrunken circuit cells Ci are equally moved to the first tier 401 and the second tier 402, in a condition that a second number of pins is more than or equal to the predetermined number of pins. In some embodiments, the at least two of the shrunken circuit cells Ci are coupled to a net that coupled between the frame Fi-1 and the frame Fi-2 via the second number of pins. For illustration of FIG. 4C, a pin (not shown) of the shrunken circuit cells Ci1-1 in the frame Fi-1 is coupled with pins (not shown) of the shrunken circuit cells Ci2-1, Ci2-2, and Ci2-3 in the frame Fi-2 at net n3, n4, and n5 respectively. Under this condition, the nets n3-n5 are coupled between the first tier 401 and the second tier 402 via a second number of the pins. Accordingly, the second number of the pins is determined to be 3. As the second number of the pins is equal to the predetermined number of the pins, the shrunken circuit cells Ci2-1 and Ci2-2 are then moved to the first tier 401, such that the number of the shrunken circuit cells Ci in the first tier 401 is equal to the number of the shrunken circuit cells Ci in the second tier 402. As shown in FIG. 4C, after the shrunken circuit cells Ci1-1, Ci2-1, Ci2-2 and Ci2-3 in the first tier 401 and the second tier 402 are adjusted, the number of the CUTS are reduced, while the number of the shrunken circuit cells Ci in the first tier 401 and the number of the shrunken circuit cells Ci in the second tier 402 are adjusted to be the same.

In some approaches, the circuit cells in a circuit design are partitioned into two tiers, according to a fixed frame size, for only minimizing the number of the connections between the tiers. Thus, such approaches are referred to as a MIN-CUT (i.e., minimizing the connections) partitioning method. In such approaches, the circuit cells would be unequally distributed between the tiers. As a result, during a routing process (e.g., aforementioned APR operation), the routing quality for the tier having more circuit cells is reduced.

Compared with the approaches above, with the arrangement of the differences $\tau$ and $\varepsilon$, not only the number of the CUTS between the first tier 401 and the second tier 402 but also the number of the differences between the cell distributions in the first tier 401 and the second tier 402 is able to be reduced. With the reduced number of the CUTS and the reduced number of the differences between the cell distributions in different tiers, wire connections of the circuit cells between different layers in the 3D IC are decreased, and the balance of distributions of the circuit cells in the 3D is increased. Accordingly, the impacts on wire length for the connections in the 3D IC during the routing process are able to be reduced. As a result, the routing quality for the first tier 401 and the second tier 402 is improved.

In some embodiments, the value of the predetermined number of pins is automatically determined by at least one design tool, for illustration, performed by the processor 110 in FIG. 1. In some embodiments, the value of the predetermined number of pins is able to be set via the I/O interfaces 130, and is stored in the memory 120 in FIG. 1. The value of the predetermined number of pins is given for illustrative purposes only. Various values of the predetermined number of pins are within the contemplated scope of the present disclosure.

With continued reference to FIG. 3, in sub-operation S304, a step size is determined based on the current balance factor $\theta'$ and the difference $\varepsilon$. In sub-operation S305, the initial frame Fi is divided into frames FS based on the step size. In some embodiments, the current balance factor $\theta'$ is the current ratio of the number of the shrunken circuit cells Ci in the first tier 401 to the number of the total shrunken circuit cells Ci. In some embodiments, the term "step size" indicates a parameter configured for adjusting the frame size.

In some embodiments, for two tiers (i.e., first tier 401 and second tier 402) the step size is defined as the following equation (1):

$$\text{step size} = |\text{current balance factor} \theta' - 0.5| \times \frac{2 \times \varepsilon}{\text{Max}(\varepsilon)} \quad (1)$$

where Max($\varepsilon$) is a maximum value of the difference $\varepsilon$ during sub-operations S302 and S303. In this example, the current balance factor $\theta'$ is the predetermined balance factor $\theta$, and Max($\varepsilon$) is 3 as shown in FIG. 4B. The processor 110 performs at least one design tool to determine the step size by using the equation (1). The processor 110 then performs at least one design tool to divide the initial frame Fi to the frames FS based on the step size.

In some embodiments, for two or more tiers, the step size is defined as the following equation (2):

$$\text{step size} = \left|\text{current balance factor} \theta' - \frac{1}{C}\right| \times \frac{2 \times \varepsilon}{\text{Max}(\varepsilon)}, \quad (2)$$

where C is an integer greater than or equal to 2. In some other embodiments, the processor 110 performs at least one design tool to determine the step size by using the equation (2).

Figure 4D:
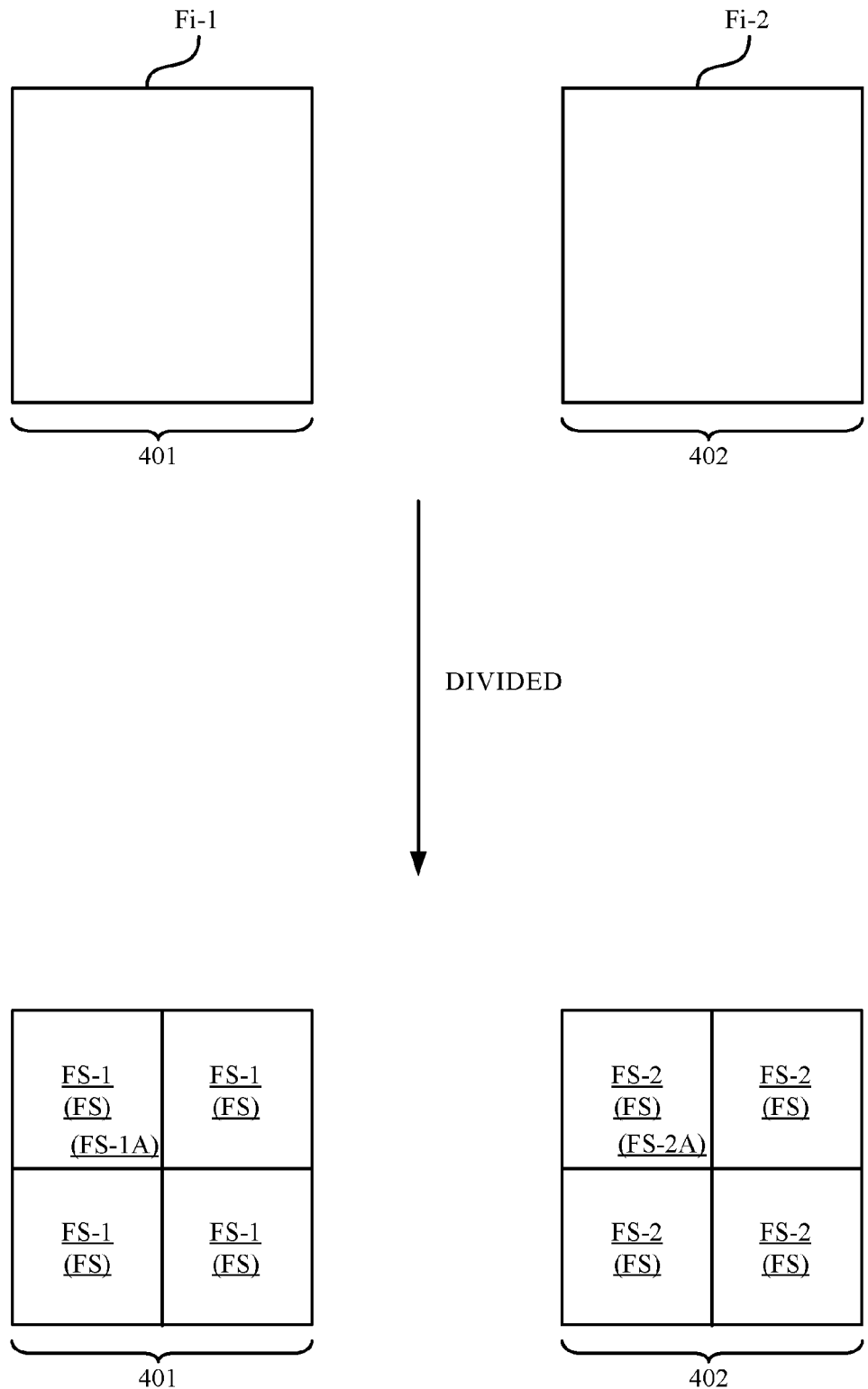
FIG. 4D is a schematic diagram illustrating sub-operations in FIG. 3 performed on the first tier and the second tier in FIG. 4A, in accordance with some embodiments of the present disclosure.

For illustrating sub-operations S304 and S305 in FIG. 3, reference is now made to FIG. 4D. FIG. 4D is a schematic diagram illustrating sub-operations S304 and S305 in FIG. 3 performed on the first tier 401 and the second tier 402 in FIG. 4A, in accordance with some embodiments of the present disclosure. For ease of understanding, with respect to FIG. 4A, like elements in FIG. 4D are designated with the same reference numbers.

In some embodiments, the initial frame Fi has a current frame size that is sufficient to cover the entire area of the first tier 401 and the entire area of the second tier 402, and each of the frames FS has a new frame size. In some embodiments, the new frame size is a product of the current frame size and the step size. In some embodiments, the new frame size is smaller than the current frame size. As shown in FIG. 4D, the initial frame Fi-1 is divided into the frames FS of the first tier 401 (for simplicity, hereinafter referred to as the frames FS-1). As described above, the frame size of the frames FS-1 is determined by the product of the frame size of the initial frame Fi-1 and the step size. Similarly, the initial frame Fi-2 is divided into the frames FS of the second tier 402 (for simplicity, hereinafter referred to as the frames FS-2). The frame size of the frames FS-2 is determined by the product of the frame size of the initial frame Fi-2 and the step size, and is equal to the frame size of the frames FS-1. Accordingly, the frame size of the frame Fi-1 is shrunken to the frame size of the frames FS-1, and the frame size of the frame Fi-2 is shrunken to the frame size of the frames FS-2.

With continued reference to FIG. 3, in sub-operation S306, whether there is any shrunken circuit cell Ci adjusted in sub-operation S303 is checked. If at least one of the shrunken circuit cells Ci is adjusted in the sub-operation S303, sub-operation S302 is performed again. Otherwise, operation S230 in FIG. 2 is performed.

If it is determined that sub-operation S302 is to be performed again, the shrunken circuit cells, which are assigned between a corresponding one of the frames FS-1 and a corresponding one of the frames FS-2, are repartitioned into the frames FS-1 and the frames FS-2. For illustration of FIG. 4D, the shrunken circuit cells (not shown) between the frame FS-1A and the frame FS-2A are repartitioned into the frames FS-1A and FS-2A. The frame FS-1A is located above or below the frame FS-2A. With this analogy, the shrunken circuit cells (not shown), between each corresponding frame of the frames FS-1 and each corresponding frame of the frames FS-2, are repartitioned. After sub-operation S302 is performed, sub-operations S303, S304, and S305 are then performed to each corresponding frame of the frames FS-1 and each corresponding frame of the frame FS-2.

In the approaches discussed above, as the circuit cells are partitioned according the fixed frame size, the locations of the circuit cells in different tiers are only considered from a specific view corresponding to the fixed frame size. Accordingly, the circuit cells in the tiers would be unequally distributed. As a result, wire length for the wire connections between the circuit cells in each tier during the routing operation are increased. Compared with the approaches above, by using the dynamic frame size as discussed above, as illustrated in sub-operations S302, S303, S304, S305, and S306 in FIG. 3, the locations of the shrunken circuit cells Ci in the first tier 401 and the second tier 402 are able to be considered from a global view (i.e., the frame having a larger frame size) to a local view (i.e., the frame having a smaller frame size). As a result, wire length for the wire connections between different tiers, including, for example, the first tier 401 and the second tier 402, during the partition and the routing operations, can be reduced.

For simplicity and illustrative purposes, the embodiments above are described with the first tier 401 and the second tier 402. The method 200 in FIG. 2 is able to be applied with more different tiers. Various numbers of the tiers, into which the circuit cells are partitioned, are within the contemplated scope of the present disclosure.

In some embodiments, at least one operation of the method 200 in FIG. 2 and operations in FIG. 3 is implemented in the form of a computer program product stored on a computer-readable storage medium having computer-readable instructions embodied in the medium. In various embodiments, any suitable storage medium is able to be used for storing the computer program product.

As discussed above, the system and the method disclosed in the present disclosure utilize a dynamic frame size to partition the circuit cells into different tiers for a 3D IC. As a result, wire connections between the different tiers during both of the partition and the routing operation can be reduced. As a result, the routing quality for the different tiers is improved.

In this document, the term "coupled" may also be termed as "electrically coupled," and the term "connected" may be termed as "electrically connected". "Coupled" and "connected" may also be used to indicate that two or more elements cooperate or interact with each other.

In some embodiments, a method includes following operations. First circuit cells are partitioned into a first frame of a first tier and the first frame of a second tier. The first frame is divided into second frames according to a step size. The first circuit cells between the second frames of the first tier and the second tier are adjusted. The first tier and the second tier, to which the adjusted first circuit cells are assigned, are merged to generate data indicating a layout design, for fabrication of the circuit cells.

In some embodiments, a method includes following operations. First circuit cells in a layout design for a two-dimensional integrated circuit (IC) are converted into second circuit cells. The second circuit cells are partitioned, based on a dynamic frame size, into a first tier and a second tier. The first tier and the second tier are merged to generate data indicating a layout design, for fabrication of a three dimensional IC. A three-dimensional IC is fabricated based on the data.

In some embodiments, a system includes a memory unit and a processor. The memory is configured to store computer program codes. The processor is configured to execute the computer program codes in the memory to partition circuit cells into a first frame of a first tier and the first frame of a second tier, to adjust the circuit cells between second frames of the first tier and the second tier, in which a frame size of the second frames is smaller than a frame size of the first tier, and to merge the first tier and the second tier to generate data indicating a layout design, for fabrication of an integrated circuit comprising the circuit cells.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   partitioning a plurality of first circuit cells into a first frame of a first tier and a first frame of a second tier;
   dividing the first frame of the first tier and the first frame of the second tier into a plurality of second frames, wherein a frame size of each of the second frames is determined according to a step size after the first circuit cells are partitioned;
   adjusting the first circuit cells, which are partitioned into the first frame of the first tier and the first frame of the second tier, between the second frames of the first tier and the second tier;
   merging the first tier and the second tier where the adjusted first circuit cells are assigned, to generate data indicating a layout design, for fabrication of the circuit cells; and
   based on the data indicating the layout design, fabricating at least one integrated circuit.

2. The method of claim 1, wherein dividing the first frame into the second frames comprises:
   determining the step size based on a balance factor and a difference between the first tier and the second tier;
   calculating the frame size of each of the second frames based on the step size and a frame size of one of the first frame of the first tier and the first frame of the second tier; and
   adjusting the frame size of each of the first frame of the first tier and the first frame of the second tier to the frame size of each of the second frames.

3. The method of claim 2, further comprising:
   determining the difference based on a number of the first circuit cells in the first frame of the first tier and a number of the first circuit cells in the first frame of the second tier,
   wherein the difference is a difference between the number of the first circuit cells in the first frame of the first tier and the number of the first circuit cells in the first frame of the second tier.

4. The method of claim 2, further comprising:
   determining the balance factor based on a number of the first circuit cells and a number of the first tier and the second tier,
   wherein the balance factor is a maximum value of a ratio of the number of the first circuit cells to the number of the first tier and the second tier.

5. The method of claim 1, wherein merging the first tier and the second tier comprises:
   merging the first tier and the second tier to generate the data, in a condition that there is no first circuit cell being adjusted between the second frames of the first tier and the second tier.

6. The method of claim 1, wherein adjusting the first circuit cells comprises:
   moving at least one of the first circuit cells, which is coupled to a net, from a first corresponding frame of the second frames of the second tier to a second corresponding frame of the second frames of the first tier, in a condition that a first number of pins is smaller than a predetermined number of pins,
   wherein the net is coupled between the second frames of the first tier and the second tier via the first number of pins, and a number of the first circuit cells in the second corresponding frame is less than a number of the first circuit cells in the first corresponding frame.

7. The method of claim 1, wherein adjusting the first circuit cells comprises:
   equally moving at least two of the first circuit cells, which are coupled to a net, to the second frames of the first tier and the second tier, in a condition that a second number of pins is greater than or equal to a predetermined number of pins,
   wherein the net is coupled between the second frames of the first tier and the second tier via the second number of pins.

8. The method of claim 1, further comprising:
   shrinking a plurality of second circuit cells in a circuit design of a two-dimensional integrated circuit by a predetermined ratio, to generate the first circuit cells.

9. A method, comprising:
   shrinking sizes of a plurality of first circuit cells in a layout design for a two-dimensional integrated circuit (IC) to generate a plurality of second circuit cells;
   partitioning, based on a dynamic frame size, the second circuit cells into a first tier and a second tier, wherein the dynamic frame size indicates a size of an area of the first tier or the second tier where the second circuit cells are partitioned into, and the dynamic frame size is constantly changed in the operation of partitioning;
   merging the first tier and the second tier to generate data indicating a layout design; and
   based on the data, fabricating a three dimensional IC.

10. The method of claim 9, wherein partitioning the second circuit cells comprises:
    generating a first frame having a first frame size for the first tier and the second tier, wherein the first frame size is about the same as an area of each of the first tier and the second tier;
    partitioning the second circuit cells into the first frame of the first tier and the first frame of the second tier;
    generating a plurality of second frames having a second frame size for the first tier and the second tier, wherein the second frame size is smaller than the first frame size; and
    partitioning the second circuit cells into the second frames of the first tier and the second frames of the second tier.

11. The method of claim 10, wherein generating the second frames comprises:
    determining a step size based on a balance factor and a difference; and
    multiplying the step size with the first frame size to determine the second frame size,
    wherein the difference is a difference between a number of the second circuit cells in the first frame of the first tier and a number of the second circuit cells in the first frame of the second tier.

12. The method of claim 10, further comprising:
    moving at least one of the second circuit cells, which is coupled to a net, from the first frame of the second tier to the first frame of the first tier, in a condition that a first number of pins is smaller than a predetermined number of pins,
    wherein the net is coupled between the first frame of the first tier and the first frame of the second tier via the first number of pins, and a number of the second circuit cells in the first frame of the first tier is less than a number of the second circuit cells in the first frame of the second tier.

13. The method of claim 10, further comprising:
equally moving at least two of the second circuit cells, which are coupled to a net, to the first frame of the first tier and the first frame of the second tier, in a condition that a second number of pins is greater than or equal to a predetermined number of pins,
wherein the net is coupled between the first frame of the first tier and the first frame of the second tier via the second number of pins.

14. The method of claim 10, wherein merging the first tier and the second tier comprises:
merging the first tier and the second tier to generate the data, in a condition that there is no second circuit cell being partitioned between the second frames of the first tier and the second frames of the second tier.

15. The method of claim 9, wherein converting first circuit cells comprising:
multiplying sizes of the first circuit cells with a predetermined ratio to generate the second circuit cells.

16. A system, comprising:
a memory configured to store computer program codes; and
a processor configured to execute the computer program codes in the memory to:
partition a plurality of shrunken circuit cells into a first frame of a first tier and a first frame of a second tier;
adjust the shrunken circuit cells between a plurality of second frames of the first tier and the second tier, wherein a frame size of each of the second frames is smaller than a frame size of the first tier and is adjusted from a bigger size to a smaller size in the operation of adjusting the shrunken circuit cells;
merge the first tier and the second tier to generate data indicating a layout design, for fabrication of an integrated circuit comprising the circuit cells; and
based on the data indicating the layout design, fabricating an integrated circuit associated with the shrunken circuit cells.

17. The system of claim 16, wherein the processor is configured to:
determine a step size based on a balance factor and a difference;
multiply the step size and a frame size of one of the first frame of the first tier and the first frame of the second tier to determine the frame size of each of the second frames; and
adjust the frame size of the first frame to the frame size of the second frames,
wherein the difference is a difference between a number of the circuit cells in the first frame of the first tier and a number of the circuit cells in the first frame of the second tier.

18. The system of claim 16, wherein the processor is further configured to:
move at least one of the circuit cells, which is coupled to a net, from the first frame of the second tier to the first frame of the first tier, in a condition that a first number of pins is smaller than a predetermined number of pins,
wherein the net is coupled between the first frames of the first tier and the second tier via the first number of pins, and a number of the circuit cells in the first frame of the first tier is less than a number of the circuit cells in the first frame of the second tier.

19. The system of claim 16, wherein the processor is further configured to:
equally move at least two of the circuit cells, which are coupled to a net, to the first frame of the first tier and the first frame of the second tier, in a condition that a second number of pins is greater than or equal to a predetermined number of pins,
wherein the net is coupled between the first frame of the first tier and the first frame of the second tier via the second number of pins.

20. The system of claim 16, wherein the frame size of the second frames is determined according to a step size that is constantly adjusted after the shrunken circuit cells are partitioned.

* * * * *